US010238091B2

(12) United States Patent
Hoffman et al.

(10) Patent No.: US 10,238,091 B2
(45) Date of Patent: Mar. 26, 2019

(54) PET HARNESS FOR ASSISTING PET MOBILITY

(71) Applicant: RADIO SYSTEMS CORPORATION, Knoxville, TN (US)

(72) Inventors: Patrick Hoffman, Arlington, TX (US); David King, Allen, TX (US); Thomas B. Murphy, Arlington, TX (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 14/859,482

(22) Filed: Sep. 21, 2015

(65) Prior Publication Data

US 2016/0007571 A1 Jan. 14, 2016

Related U.S. Application Data

(63) Continuation of application No. 13/769,794, filed on Feb. 18, 2013, now abandoned.

(60) Provisional application No. 61/599,456, filed on Feb. 16, 2012.

(51) Int. Cl.
*A01K 27/00* (2006.01)
*A01K 15/02* (2006.01)

(52) U.S. Cl.
CPC .......... *A01K 27/002* (2013.01); *A01K 15/027* (2013.01)

(58) Field of Classification Search
CPC .. A01K 27/002; A01K 1/0263; A01K 1/0613; A01K 15/027; Y10S 119/907
USPC ................ 119/792, 725, 856, 863
See application file for complete search history.

(56) References Cited

U.S. PATENT DOCUMENTS

| 378,153 | A | | 2/1888 | Tiffany |
|---|---|---|---|---|
| 597,317 | A | | 1/1898 | Ellsworth |
| 1,277,052 | A | * | 8/1918 | Dunn ............... A01K 1/0613 119/725 |
| 1,685,435 | A | | 9/1928 | Philbrick |
| 1,800,421 | A | | 4/1931 | Wickersham et al. |
| 2,026,383 | A | | 12/1935 | Gyulay |
| 2,605,744 | A | | 8/1952 | Urbanski |
| 2,817,393 | A | | 12/1957 | Mitchell |
| 2,826,172 | A | | 3/1958 | Buckle et al. |
| 3,310,034 | A | | 3/1967 | Dishart |
| 3,768,445 | A | | 10/1973 | Sorrels |
| D245,350 | S | | 8/1977 | Geary |
| 4,060,056 | A | | 11/1977 | Maietta |
| 4,106,266 | A | | 8/1978 | Hibbert |
| 4,337,610 | A | | 7/1982 | Taylor |

(Continued)

FOREIGN PATENT DOCUMENTS

| DE | 3837507 | 1/1990 |
|---|---|---|
| DE | 29618168 | 12/1996 |

(Continued)

*Primary Examiner* — Son T Nguyen

(74) *Attorney, Agent, or Firm* — Baker, Donelson, Bearman, Caldwell & Berkowitz PC

(57) ABSTRACT

The invention presents a harness assembly for lifting and supporting an animal in mobility. The assembly comprises a front and rear harness sections releasably attached by a lifting leash. Both the front and rear harness sections can be used independently. Both the front and rear harness sections are comprised of upper and lower sections releasably attached to one another. The rear harness section lifts the animal from both the hips and waist resulting in less stress than other devices.

8 Claims, 8 Drawing Sheets

(56) References Cited

U.S. PATENT DOCUMENTS

| | | | | |
|---|---|---|---|---|
| 4,483,275 | A | 11/1984 | De Groot | |
| 4,495,753 | A | 1/1985 | Simpson | |
| 4,530,309 | A | 7/1985 | Collins | |
| 4,553,633 | A | 11/1985 | Armstrong | |
| 4,559,906 | A | 12/1985 | Smith | |
| 4,565,055 | A | 1/1986 | Simpson | |
| 4,566,255 | A | 1/1986 | Degroot | |
| 4,676,198 | A | 6/1987 | Murray | |
| 4,964,369 | A | 10/1990 | Sporn | |
| 4,969,419 | A | 11/1990 | Fong | |
| 5,094,062 | A | 3/1992 | Clark | |
| 5,146,875 | A | 9/1992 | Bolt | |
| 5,154,660 | A | 10/1992 | Snyder | |
| 5,199,383 | A | 4/1993 | Lagana | |
| 5,247,905 | A | 9/1993 | Arakawa | |
| 5,305,710 | A * | 4/1994 | Ward, Jr. | A01K 1/0263 119/756 |
| 5,325,819 | A | 7/1994 | Krauss | |
| 5,329,885 | A | 7/1994 | Sporn | |
| 5,335,627 | A | 8/1994 | Bandimere | |
| 5,383,426 | A | 1/1995 | Krauss | |
| 5,471,953 | A | 12/1995 | Sporn | |
| 5,485,810 | A | 1/1996 | Sporn | |
| 5,503,113 | A | 4/1996 | Knight | |
| 5,511,515 | A | 4/1996 | Brown et al. | |
| 5,529,018 | A | 6/1996 | Butts | |
| 5,611,298 | A | 3/1997 | Sporn | |
| 5,676,093 | A | 10/1997 | Sporn | |
| 5,690,059 | A | 11/1997 | Woods | |
| 5,706,764 | A | 1/1998 | Irbinskas | |
| 5,713,308 | A | 2/1998 | Holt, Jr. | |
| 5,743,216 | A | 4/1998 | Holt, Jr. | |
| 5,785,010 | A | 7/1998 | Koch | |
| 5,791,295 | A | 8/1998 | Schmid et al. | |
| 5,794,571 | A | 8/1998 | Goldberg | |
| 5,845,606 | A * | 12/1998 | Hartman | A01K 13/00 119/856 |
| 5,893,339 | A | 4/1999 | Liu | |
| 5,896,831 | A * | 4/1999 | Alpert | A01K 27/002 119/792 |
| 5,911,200 | A | 6/1999 | Clark | |
| 5,915,335 | A | 6/1999 | Holt, Jr. | |
| 5,937,794 | A | 8/1999 | Hediger | |
| 5,947,062 | A | 9/1999 | Hoffman | |
| 5,967,095 | A | 10/1999 | Greves | |
| 5,992,352 | A | 11/1999 | Borchelt et al. | |
| 6,085,694 | A | 7/2000 | Simon | |
| 6,101,979 | A | 8/2000 | Wilson et al. | |
| 6,161,505 | A * | 12/2000 | Noguero | A01K 27/003 119/792 |
| 6,167,844 | B1 | 1/2001 | Cantrell et al. | |
| 6,213,057 | B1 | 4/2001 | Franco et al. | |
| 6,295,795 | B1 | 10/2001 | Ehrmann | |
| 6,314,915 | B1 | 11/2001 | Pope et al. | |
| 6,354,247 | B1 | 3/2002 | Andrews | |
| 6,367,424 | B1 | 4/2002 | Higham | |
| 6,401,666 | B1 | 6/2002 | Kircher | |
| 6,427,635 | B1 | 8/2002 | Ballard | |
| 6,450,130 | B1 | 9/2002 | Goldberg | |
| 6,463,888 | B2 | 10/2002 | Clark | |
| 6,543,390 | B2 * | 4/2003 | Lowery | A01K 1/0263 119/771 |
| 6,564,754 | B1 | 5/2003 | Cohen | |
| 6,612,265 | B1 | 9/2003 | Birdsong | |
| 6,637,377 | B2 | 10/2003 | Lobanoff et al. | |
| D511,596 | S | 11/2005 | Mugford | |
| 6,976,453 | B2 | 12/2005 | Goudal | |
| 7,107,939 | B2 | 9/2006 | Lady | |
| 7,165,511 | B1 | 1/2007 | Brezinski | |
| 7,284,504 | B1 * | 10/2007 | Purschwitz, Jr. | A01K 27/002 119/792 |
| 7,284,505 | B1 * | 10/2007 | Paxton | A01K 27/00 119/792 |
| 7,357,099 | B2 | 4/2008 | Smith et al. | |
| 7,891,322 | B2 | 2/2011 | Bennett et al. | |
| 2004/0000273 | A1 | 1/2004 | Lady | |
| 2005/0263102 | A1 * | 12/2005 | Sherman | A01K 1/0263 119/792 |
| 2006/0064949 | A1 * | 3/2006 | Chang | A01K 13/008 54/79.2 |
| 2006/0236954 | A1 * | 10/2006 | Abinanti | A01K 27/001 119/792 |
| 2007/0044735 | A1 * | 3/2007 | Zimmerman | A01K 27/002 119/856 |
| 2007/0113798 | A1 * | 5/2007 | Torjesen | A61D 3/00 119/725 |
| 2008/0276880 | A1 * | 11/2008 | Swisher | A01K 27/002 119/728 |
| 2010/0122667 | A1 * | 5/2010 | Horgan | A01K 27/002 119/792 |
| 2010/0199927 | A1 * | 8/2010 | Cigard | A01K 1/0263 119/850 |
| 2011/0308479 | A1 * | 12/2011 | Kuo | A01K 27/002 119/792 |
| 2012/0186537 | A1 * | 7/2012 | Curtis | A61D 9/00 119/725 |
| 2012/0318211 | A1 * | 12/2012 | Madonna | 119/792 |

FOREIGN PATENT DOCUMENTS

| | | |
|---|---|---|
| EP | 1206905 | 8/2003 |
| FR | 2301273 | 9/1976 |
| FR | 2502962 | 10/1982 |
| GB | 2195224 | 4/1988 |
| GB | 2201874 | 9/1988 |
| GB | 2228660 | 9/1990 |
| WO | 2005/041645 | 5/2005 |

\* cited by examiner

PET HARNESS FOR ASSISTING PET MOBILITY

TECHNICAL FIELD

The invention generally relates to a harness for carrying pets, primarily canines, and assisting pets in mobility.

BACKGROUND

A pet harness, as the term is used herein, provides physical support for a pet, during walking or lifting by the pet's owner, to assist in functions such as walking, elimination, movement to a new location, etc. A harness is contrasted with leashes, muzzles, restraining devices, mechanisms for support during motor transport, and the like. The discussion herein will typically refer to a harness for a canine, although the system may be used with other four-legged animals as well.

A typical front harness provides support at the dog's chest or under each front leg joint and has loops through which the fore legs are positioned. Such a front harness, obviously, can be used to lift or provide mobility assistance at the front of the dog, such as where the forelegs are injured, diseased, weak, etc. A rear harness similarly provides support for the rear portion of a dog and typically has loops through which the hind legs extend and supports the dog under the hind leg joints and abdomen. A rear harness provides mobility assistance at the rear of the dog, such as where the hind legs are injured, diseased, weak, etc. However, lifting primarily at the leg joints (or at the abdomen) places undo stress on the pet. Further, for dog's with more serious mobility issues it is desirable to provide support at both front and rear, and even to allow lifting completely from the ground.

There is a need for a harness that assists injured, diseased, or invalid dogs in mobility for routine, daily activities such as elimination, movement from one locale to another, etc. A need exists for a harness providing lifting or support without placing undue strain or stress at either the leg joints or abdomen. Further, there is a need for an adjustable harness which can be adjusted to meet the needs of dogs of varying size.

SUMMARY

The embodiments provide a harness assembly for carrying and assisting animals in mobility. The harness assembly comprises a front harness section and a back harness section connected together by a detachable lifting leash. The front harness section comprises an upper section and a lower section releasably connected by at least one latching mechanism. The lower section comprises a right foreleg strap, a left foreleg strap and a chest strap arranged to provide support at the dog's chest and under the front leg joints. The front upper section is provided with a lifting handle. The rear harness section comprises a waist band upper section and waist band lower section. The waist band upper and lower sections are releasably connected through at least one adjustable and releasable latching mechanism. The rear harness section has a right hind leg loop and a left hind leg loop through which the hind legs extend. The right hind leg loop and the left hind leg loop are connected to the waist band upper section through adjustable latching mechanisms. For elimination, the upper and lower waist band sections are detached, and the lower section pulled from beneath the dog. The free end of the lower waist band can be temporarily latched to a releasable latching mechanism on the upper waist band such that the lower waist band remains to one side during elimination. The waist band upper section has a lifting handle situated at its top. The detachable lifting leash is preferably lengthwise adjustable, keeps the harness sections from falling off the dog, is releasably latched to the front and rear harness sections, and, when extended, can be used as a shoulder strap by the owner to lift or assist the dog. Alternately, the invention provides for individual use of either the front or rear harness.

BRIEF DESCRIPTION OF THE DRAWINGS

The other objects, features and advantages will occur to those skilled in the art from the following description of the preferred embodiment and the accompanying drawings in which.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Modifications may be made within the scope of the embodiments herein without departing from the spirit thereof, and the embodiments herein include all such modifications.

DETAILED DESCRIPTION OF EMBODIMENTS OF THE INVENTION

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that changes may be made without departing from the scope of the invention. The following detailed description is therefore not to be taken in a limiting sense.

Figure 1:
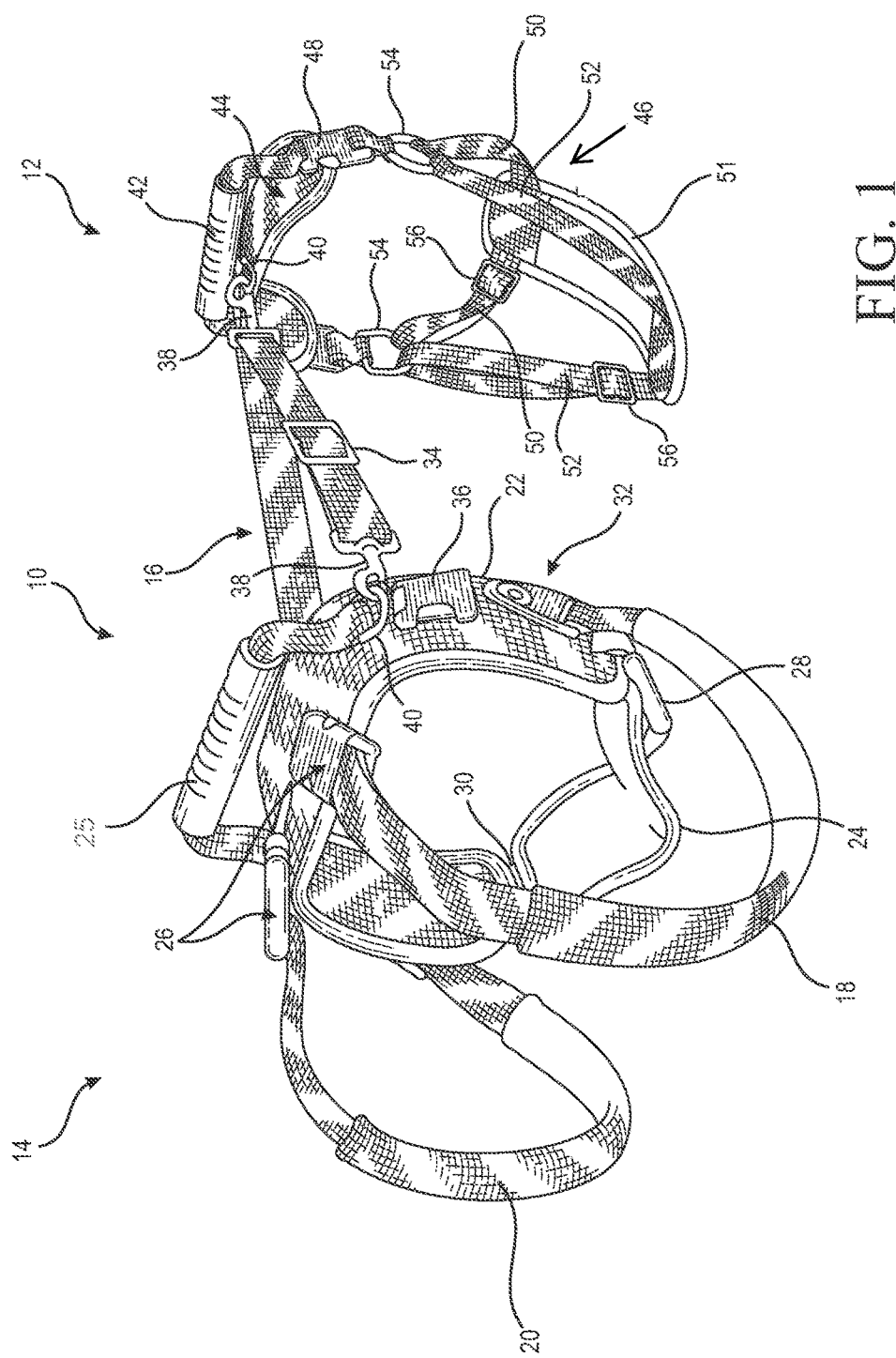
FIG. 1 is a perspective view of a harness assembly used for carrying and assisting animals in mobility, according to one embodiment herein.

FIG. 1 is a perspective view of a harness assembly used for assisting animals in mobility, according to one embodiment. With respect to FIG. 1, the harness assembly 10 comprises a front harness section 12 and a rear harness section 14. The front harness section 12 is connected with the rear harness section 14 by a selectively detachable lifting leash 16. The detachable lifting leash, in one mode of use, is left in an attached position to both the front and rear harness sections. This connection prevents the front and/or rear harness sections from falling off the dog or from sliding down the torso or legs such that the harness is no longer effective as a lifting device. Typical rear harnesses fall or slide while the dog is wearing the harness, making it necessary to re-adjust or put back on the harness.

The front harness section 12 comprises an upper section 44 and a lower section 46 connected together by at least one releasable latching mechanism 48. Preferably, the lower section and upper section are releasably attached at each side (left and right) as shown. A preferred releasable latch mechanism at these points is a side-release buckle. Such buckles have a male and female end which cooperate to latch securely together. Each end, male and female, is attached to one of the two items to be releasably attachable. For example, a strap loop extending around a bar located on the male/female end can be stitched, riveted, etc., to an upper or lower section of the harness.

The terms "releasable attachment mechanism," "releasable latching mechanism," "latching mechanism," and the like, as used herein means a device for connecting two members (such as straps or the two ends of a strap) together which can be repeatedly attached and detached from one another. The term includes, as examples, links, spring links, carabiners, spring snaps, screw links, metal or plastic clips, Velcro (trade name) attachments, side release buckles, lift release buckles, split release buckles, buckles with detachable male and female ends, etc., such as are known in the art. Where a particular mechanism is called out in a preferred embodiment, practitioners will recognize suitable substitutes.

The terms "adjustable," "adjustment mechanism," and the like, as used herein, refers to the condition of being able to lengthen and/or shorten a strap, or to the mechanism for lengthening and/or shortening the strap. Adjustment mechanisms include, for example, double rings, Velcro (trade name) straps, ratchets, ribbon bands, slide bands, lanyards, etc. Where a particular mechanism is called out in a preferred embodiment, practitioners will recognize suitable substitutes.

The front harness lower section 46 includes foreleg straps 50, 52 which are connected by a chest strap 51 extending between them. The straps 50, 51 and 52 are arranged to form a right foreleg loop (and opening) and a left foreleg loop (and opening). The loops and, therefore, the openings, are adjustable, such as with slide buckles 56, as shown. Note that the construction of the loops can vary. For example, in the preferred embodiment shown, the left and right loops are formed by two adjustable-length straps, each extending from and attached to O-rings or D-rings 54. Each strap 50, 52 is slidably attached to the chest strap 51, such as by extending through openings defined by the chest strap. Thus, adjustment of a strap 50, 52 changes the size of the leg loop and opening. Alternate arrangements will be apparent to those of skill in the art. The rings 54 also serve as attachments for the releasable latching mechanisms 48.

Figure 2:
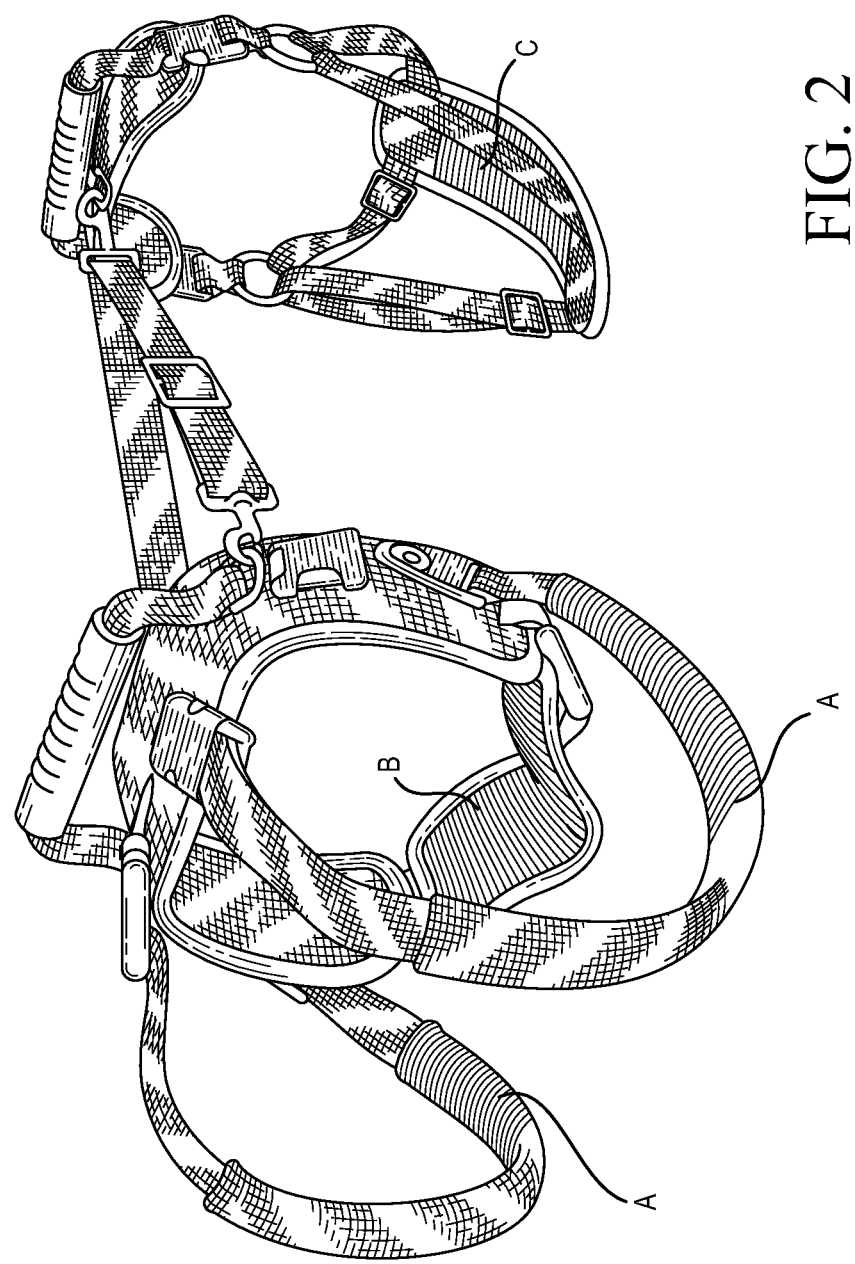
FIG. 2 is a perspective view of the harness assembly of FIG. 1 displaying load-bearing areas according to one embodiment herein.

The chest strap 51 is preferably padded and wider than the other straps to provide less stress to the chest area of the animal, since the chest strap includes a load-bearing area, C, as seen in FIG. 2, when lifting the dog using the front harness section. The padding can be an inherent part of strap, a sleeve positioned around the strap, etc.

The front harness upper section 44 has a front harness lifting handle 42 attached, such as by stitching, rivets, etc. The front harness handle can be used alone to lift the front portion of the dog or in conjunction with the rear handle to lift both the front and rear of the dog.

The rear harness section 14 comprises a waist band divided into an upper waist band section 22 releasably attached to a lower waist band section 24 by at least one, and preferably two, releasable latching mechanisms 28, 30.

Further, the upper and lower waist band sections are preferably adjustable, such that the waist band can be enlarged or decreased in size to fit different sized dogs. Preferably, latching mechanisms 28, 30 are both adjustable and releasable, such as single adjustable side release buckles.

The lower waist band section 24 is used to comfortably lift the dog from the waist, since the waist band includes a load-bearing area, B, as seen in FIG. 2. However, during elimination it is necessary to temporarily remove the lower section 24 from beneath the dog. The releasable latching mechanisms 28 or 30 allow for detachment of one end (or both ends) of the lower waist band section. An "extra" releasable latching mechanism 36 is provided, attached to the upper section 22, such that the free end of the lower waist band (in this embodiment, at unlatched latching mechanism 30) can be temporarily attached to the extra latching mechanism 36. Note that the extra latching mechanism 36, in the preferred embodiment shown, is simply one-half of a side release buckle which corresponds to the half of the buckle 30 positioned at the free end of the lower waist band. The extra latching mechanism 36 provides for easy stowage of the loose end of the lower waist band, maintaining the lower waist band out of the way and easily accessible for re-attachment.

The lower waist band section can also include a pocket (not shown) into which a shaped, rigid plate (not shown) can be inserted to provide additional space for the comfort of a male dog. The plate is preferably removable.

The waist band upper section 22 is connected with a right hind leg strap 18 and a left hind leg strap 20, forming right and left hind leg loops (and openings), respectively. Each hind leg strap is connected to the waist band upper section 22 at the rump of the dog by a releasable latching mechanism 26. The releasable mechanisms 26 are preferably adjustable, side release buckles, and therefore also allow for adjustment of the length of the hind leg straps. The hind leg straps are preferably padded since the straps include load-bearing areas, A, positioned below the dog's hips, as seen in FIG. 2.

Figure 3:
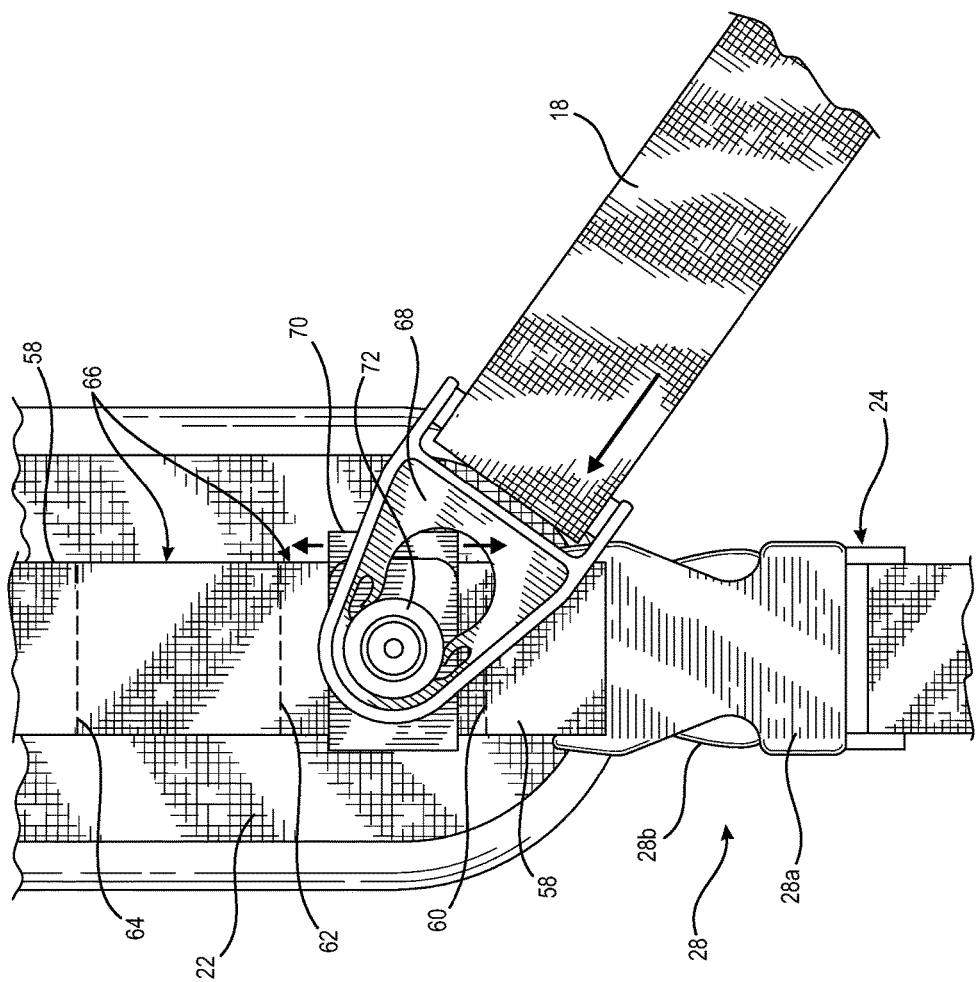
FIG. 3 is a detail side elevation view of an adjustable pivot yoke assembly of a harness according to an embodiment herein.
Figure 4:
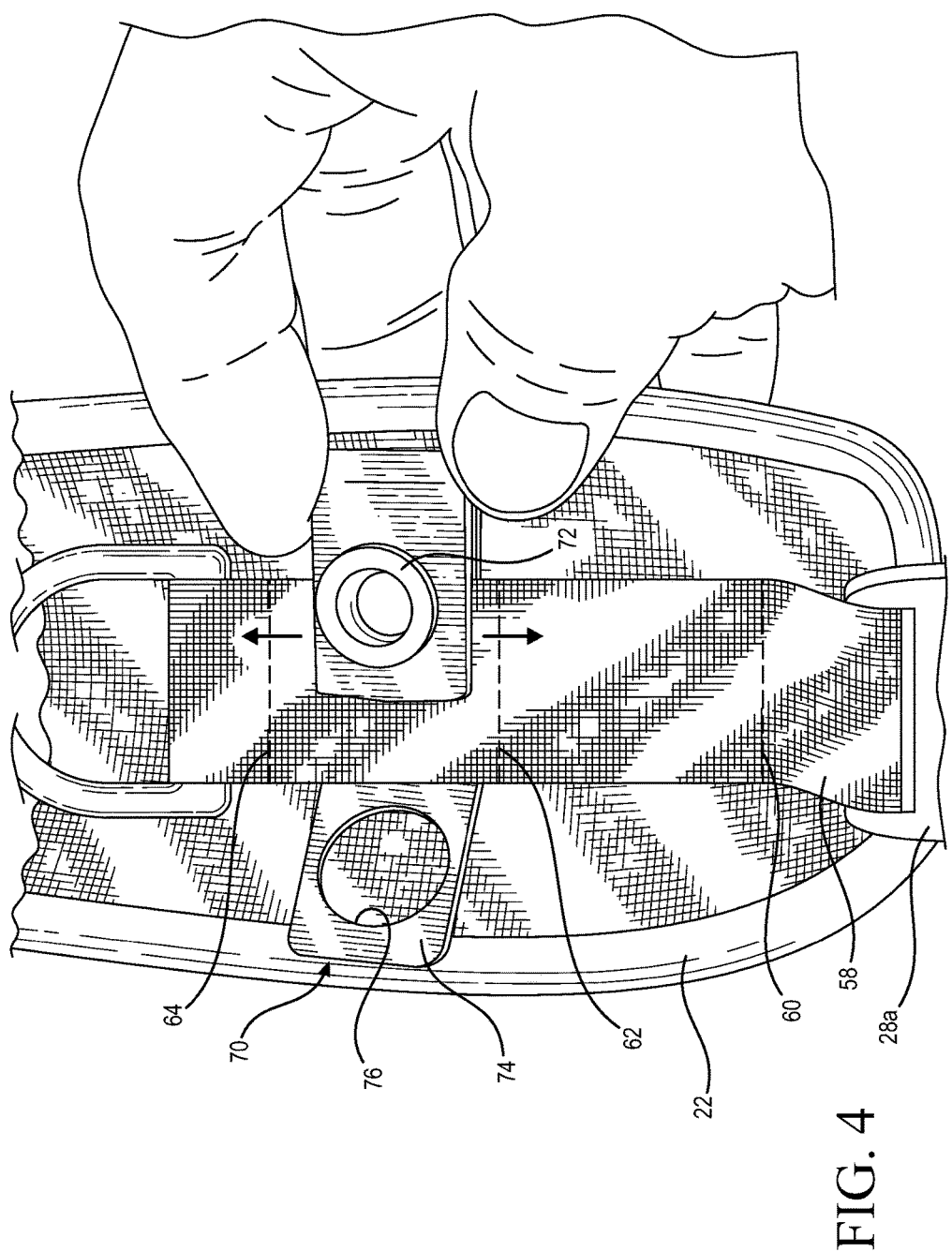
FIG. 4 a detail side elevation view of the adjustable pivot yoke assembly of FIG. 3 being adjusted according to an embodiment herein.

At the forward or hip end of the hind leg straps 18, 20, (positioned near the dog's hip when in use) are preferably provided adjustable, releasable and pivotal anchor assemblies 32, one on each side. FIG. 3 shows an exemplary yoke anchor assembly according to an aspect of the invention. FIG. 4 shows the adjustable releasable yoke anchor released for movement to a position point. The adjustable yoke anchor assembly comprises a yoke anchor member 70 having a yoke anchor post 72 extending outwardly therefrom and cooperating with releasable yoke 68 connected to the hip end of the hind leg strap 18 (or 20). The yoke member 68 slides onto and releasably attaches to post 72 of the yoke anchor member 70. Further, in the preferred embodiment, the yoke 68 is able to pivot freely about the post 72. In use, to disengage the yoke from the anchor post, the strap and yoke are pulled in the direction indicated by the arrow seen on the strap 18 in FIGS. 3 and 4, and then pulled away from the anchor post thereby freeing the yoke member.

FIG. 2 is a perspective view showing the lead bearing regions or areas of the harness assembly according to an embodiment of the invention. With respect to FIG. 2, the A, B and C areas are load-bearing regions of the harness assembly 10. Support can be provided at front and rear hips, chest and waist depending on the method of use and portions of the assembly in use.

The yoke anchor member 70 is movable between various height positions, as indicated by the vertical arrows in FIGS. 3-4. In a preferred embodiment, attachment positions 66 are defined on the upper waist band section 22 between stitching lines 60, 62 and 64, which connect strap 58 to the upper waist band at each stitching line. The yoke anchor member 70 is shown as a tri-fold snap-mount which is detachable from the upper waist band. In use, the tri-fold mount is un-snapped, unfolded, and slid from the attachment point. The tri-fold mount is moved to a selected attachment position 66, slid under the strap between two of the stitching lines 60, 62, 64, re-folded, and snapped together. Note that the tri-fold member may have a single pliable fold, with a rigid second fold as seen in FIG. 4. Further, the two end sections of the tri-fold member can snap together with an independent snap assembly or can simply have an opening 76 in one tri-fold section 74 fit over the anchor post 72. Further, the yoke member 68 can act to maintain the tri-fold member closed. Other arrangement will be apparent to those of skill in the art.

Also seen in FIG. 3 is an exemplary side release buckle 28 having a male end 28b attached to lower waist band 24 and fitted into female end 28a which, in turn, is attached to strap 58 of the upper waist band section 22.

A rear harness lifting handle 25 is situated on the waist band upper section 22 to lift the rear of the animal. The rear harness lifting handle 25 is preferably sewn to the waist band upper section 22. The rear harness handle can be used alone to left the rear of the dog, or in conjunction with the front harness handle 42 to lift or support the entire dog.

Figure 5:
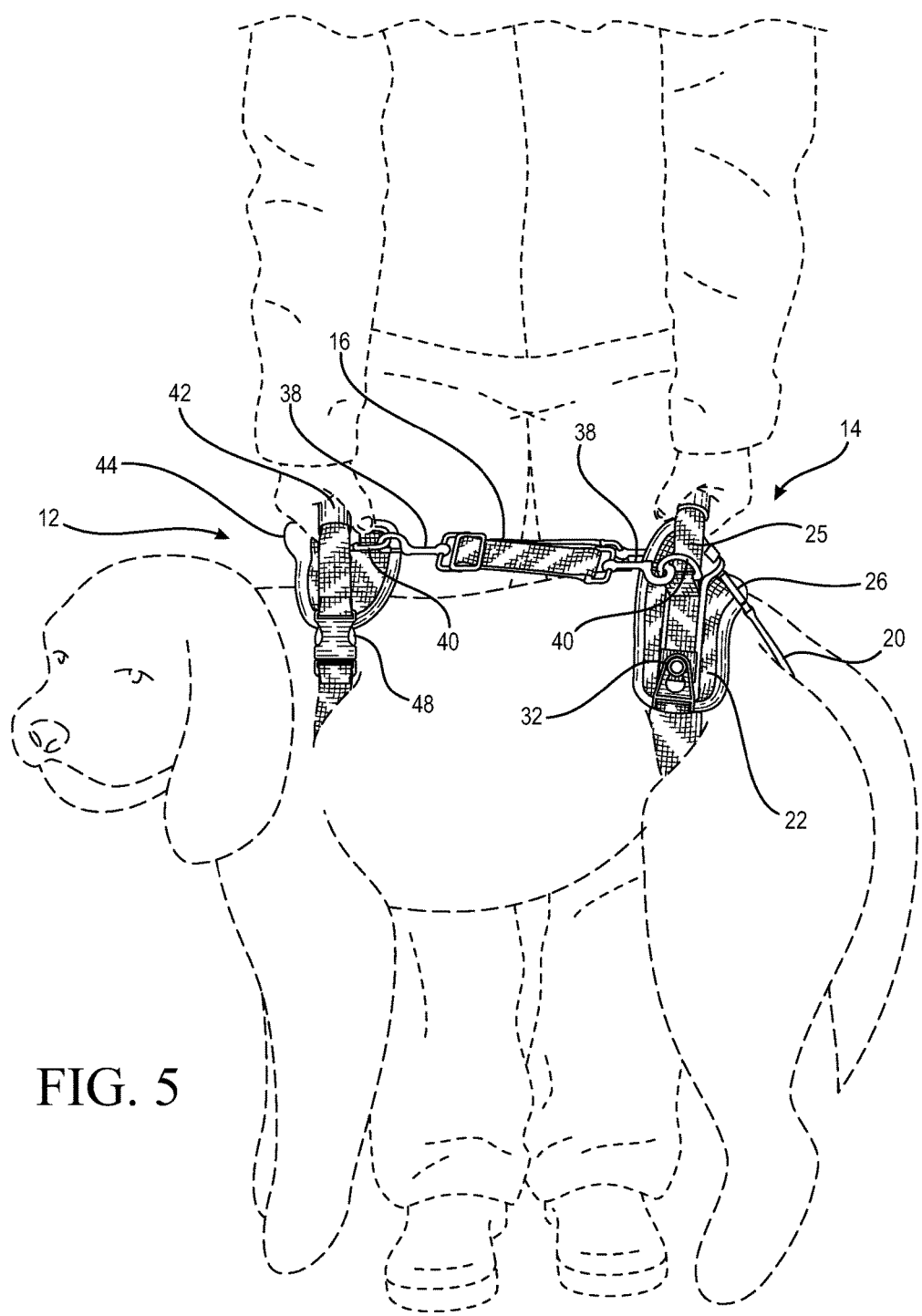
FIGS. 5-7 show alternate methods of use of the harness assembly of FIG. 1 according to embodiments herein.
Figure 7:
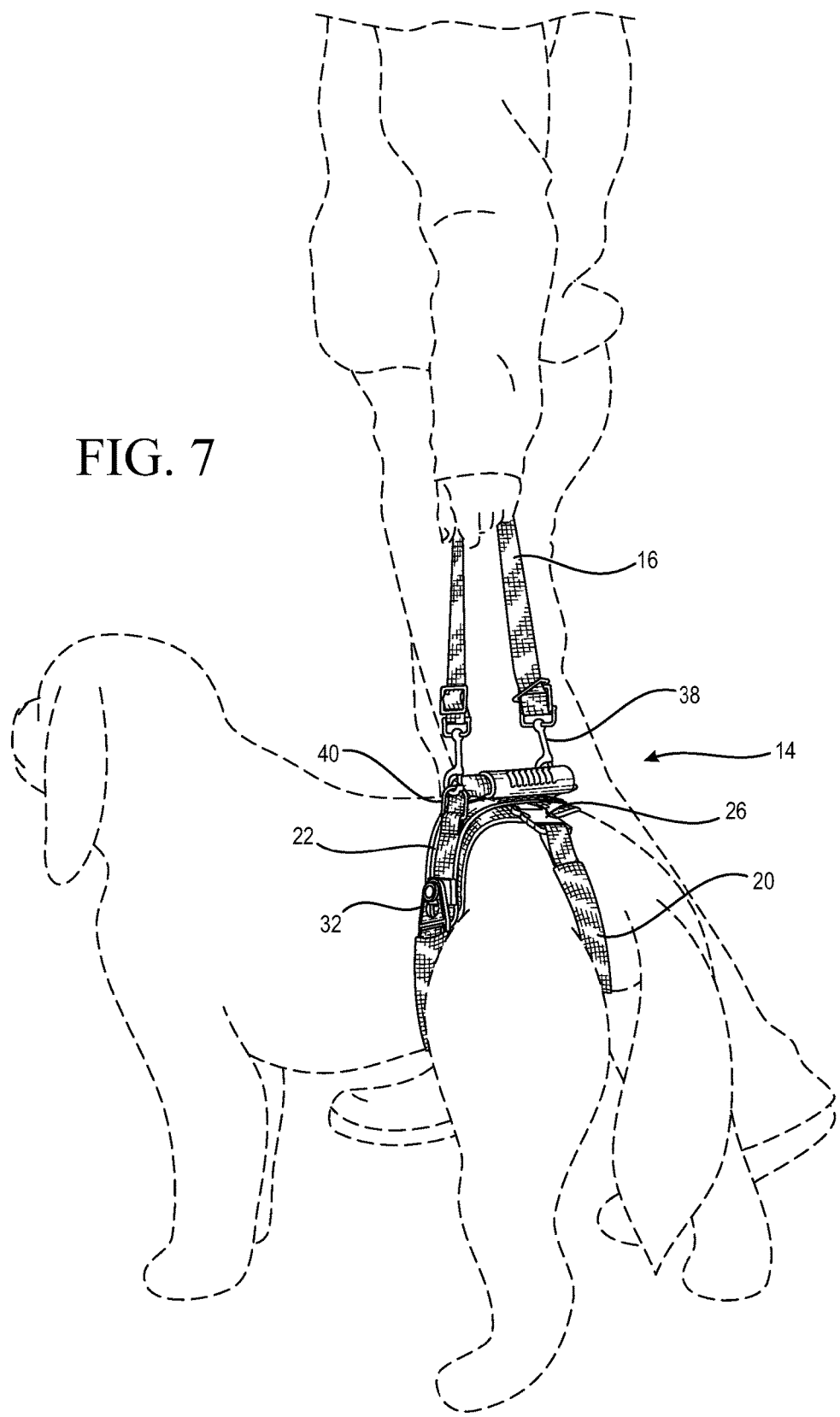

The detachable lifting leash 16 is lengthwise adjustable, such as at adjustment mechanism 34. The detachable lifting leash 16 is releasably attachable to the front and rear harness sections by releasable attachment mechanisms, such as spring loaded snap swivels 38. As seen in FIGS. 5 and 7, the leash 16 can be used in multiple manners, including as a lifting point when using the rear harness section alone or, as in normal use with both harness sections, as an attachment mechanism between the front and rear harness sections. In a preferred embodiment, the lifting leash 16 has three attachment mechanisms 38 attachable to the harness sections at corresponding D-rings 40. When it is desired to lift or support only the rear of the dog, the attachment mechanism 38 at the front harness section is released and the leash is used to provide support, as seen in FIG. 7.

Figure 8:
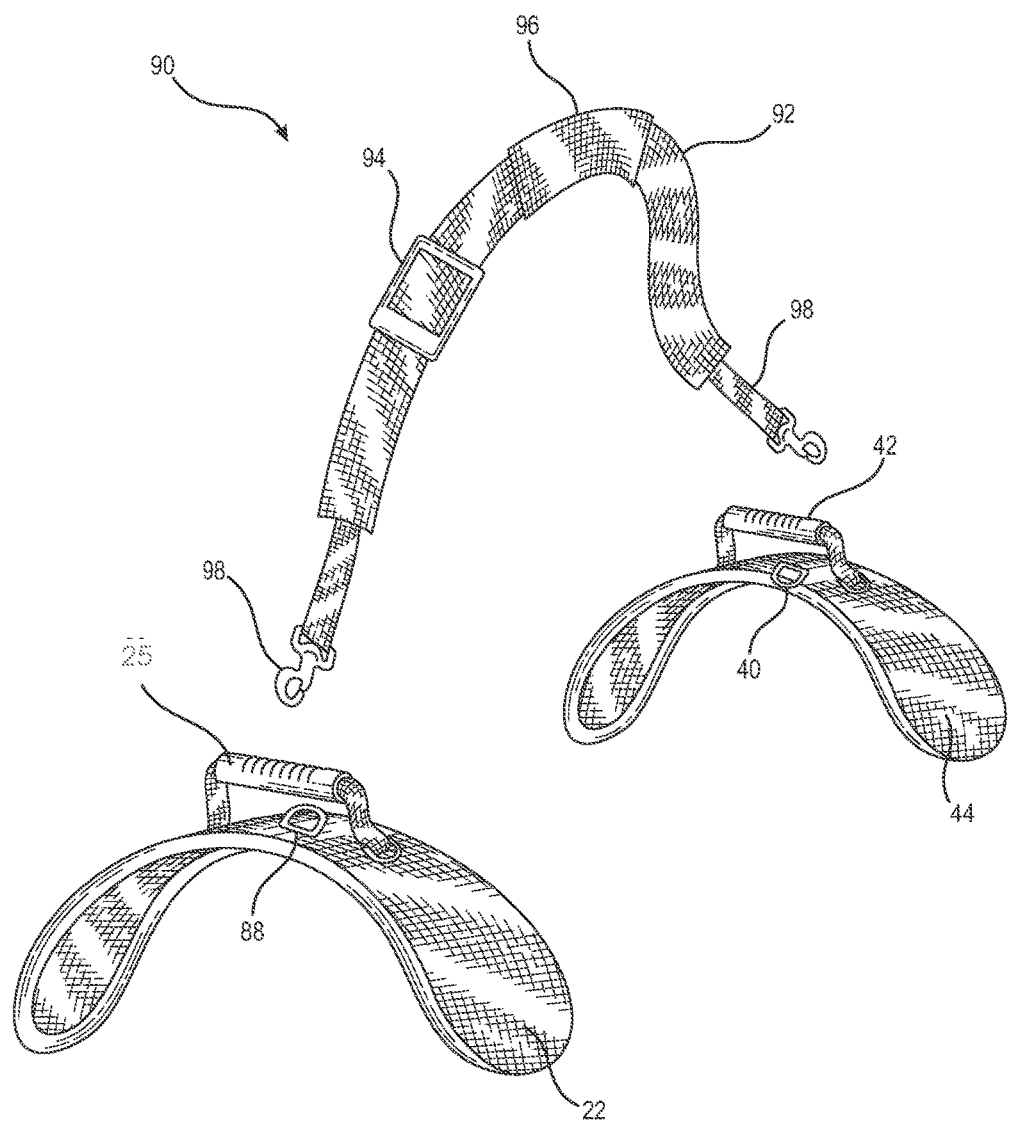
FIG. 8 is an exploded view of a shoulder strap assembly for use with the harness assembly according to FIG. 1.

FIG. 8 shows a perspective view of an adjustable shoulder strap assembly, according to an embodiment of the invention. The shoulder strap assembly 90 comprises a longitudinally extending strap 92 with selectively detachable mechanisms 98, such as the spring-loaded, snap swivels shown. A shoulder pad 96 can be used. The attachment mechanisms 98 releasably connect to the front harness section, such as at D-ring 40, and to the rear harness section, such as at D-ring 88.

Figure 6:
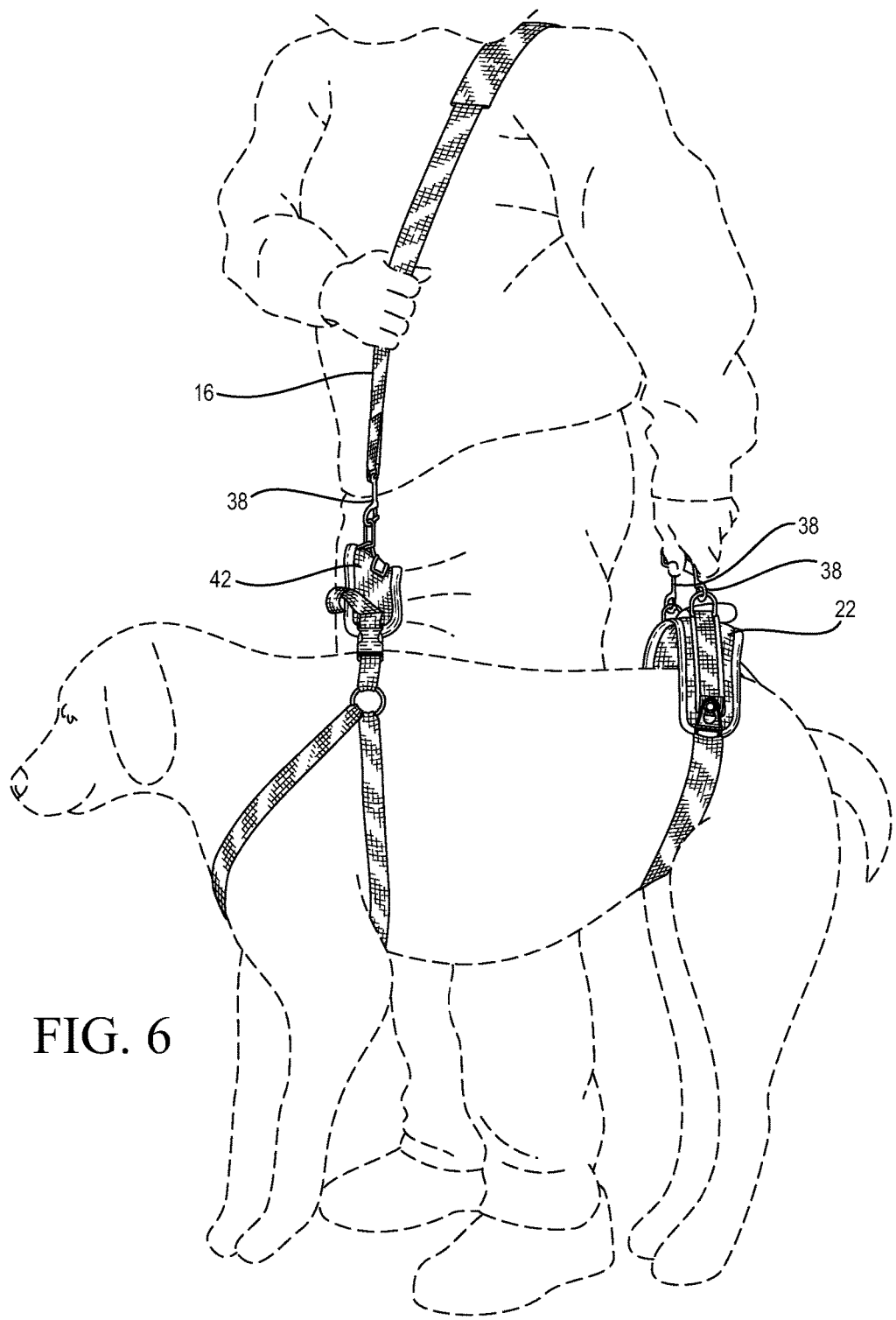

FIG. 5 illustrates an exemplary way for the harness assembly to lift a dog from both the front 12 and the back 14 harness sections using handles 42 and 26. FIG. 6 shows an exemplary method of lifting both front and rear of a dog using the lifting leash 16 as a shoulder strap attached to front and rear harness sections 12 and 14 at D-rings 40. FIG. 7 shows an exemplary method of lifting a dog's rear portion using the rear harness section 14 and lifting leash 16. FIG. 8 illustrates a shoulder strap, attachable to front and rear harness sections of the assembly, and useful for lifting the dog at both front and rear.

The full-body configuration, both front and rear harness 12 and 14, and lifting leash 16, may be comfortably worn full-time to make it easy to assist the pet without the hassle of installing the harness each time. The design of the rear section lifts dogs from both the hips and abdomen, resulting in less stress than similar devices which lift only from either the hips or abdomen.

The foregoing description of the specific embodiments discloses the general nature of the embodiments herein that others can, by applying current knowledge, readily modify and/or adapt for various applications without departing from the spirit of the invention. Such adaptations and modifications should and are intended to be comprehended within the claimed invention or range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims. The claims appended hereto set forth the scope and limitations of the invention.

It is claimed:

1. A harness assembly for user-assisted animal mobility, the harness assembly comprising:
   a front harness having an upper section and a lower section connected together by at least one releasable latching mechanism and a handle for lifting the front end of the animal;
   a rear harness having a handle connected to a waist band for lifting the animal from the waist, the waist band having an upper section and a lower section releasably connected by a first releasable latching mechanism; the rear harness having a right leg loop and a left leg loop, each leg loop having a first end connected to the upper section of the waist band and a second end also connected to the upper section of the waist band, the leg loops for supporting the animal from the rear legs, wherein one end of each of the right leg loop and the left leg loop comprises a releasable attachment component, wherein the releasable attachment component releasably attaches to an anchor of a corresponding adjustable pivot anchor of the upper section of the waist band, wherein the corresponding adjustable pivot anchor is movable among locations along a portion of the upper section of the waist band, wherein the releasable attachment component is rotatable around the anchor;
   the first releasable latching mechanism releasable during use of the harness assembly to temporarily move the lower section of the waist band to allow elimination of waste by the animal without soiling the lower section of the waist band;
   a user's shoulder strap releasably connected to the front harness and the rear harness, the user's shoulder strap for lifting the animal; and
   the upper section of the waist band having a secondary releasable latching mechanism for cooperating with a released end of the lower section of the waist band for temporarily holding the lower section of the waist band out of the way during elimination.

2. The harness assembly according to claim 1, wherein the front harness lower section further comprises a right foreleg loop, a left foreleg loop, and a chest strap.

3. The harness assembly according to claim 1, wherein the releasable latching mechanisms include at least one link, spring link, carabiner, spring snap, screw link, metal or plastic clip, Velcro (trade name) attachment, side release buckle, lift release buckle, split release buckle, buckle with detachable male and female ends, single adjustable side release buckle, double adjustable side release buckle, or snap swivel.

4. An animal harness assembly enabling a user to assist an animal's mobility, the assembly comprising:
   a waist band for supporting the animal from the waist, the waist band having a lower section releasably coupled to an upper section of the waist band by a primary releasable latching mechanism;
   a right leg loop and a left leg loop each having a first end and a second end connected to the upper section of the waist band, the leg loops for supporting the animal from the hind legs, wherein one end of each of the right leg loop and the left leg loop comprises a releasable attachment component, wherein the releasable attachment component releasably attaches to an anchor of a corresponding adjustable pivot anchor of the upper section of the waist band, wherein the corresponding adjustable pivot anchor is movable among locations along a portion of the upper section of the waist band, wherein the releasable attachment component is rotatable about the anchor; and
   the waist band lower section selectively releasable during use of the harness assembly at the primary releasable attaching mechanism, a released end of the lower section of the waist band movable from extending beneath the animal's waist; and
   a secondary releasable latching mechanism attached to the upper section of the waist band for selectively and releasably connecting to the released end of the lower section of the waist band, thereby maintaining the lower section of the waist band removed from beneath the animal's waist.

5. The harness of claim 4, wherein the waist band further comprises a third releasable latching mechanism selectively connecting the lower and upper sections of the waist band on a side of the animal opposite the primary releasable latching mechanism.

6. The harness of claim 4, further comprising a front harness assembly for supporting the animal from the chest, the front harness assembly having right and left foreleg loops for extending around the animal's forelimbs, the foreleg loops attached to and partially formed by a chest strap, an upper section of the front harness for extending across the animal's back connected by a releasable latching mechanism to the foreleg loops.

7. The harness of claim 6, further comprising a first handle attached to the waist band and a second handle attached to the front harness.

8. The harness of claim 4, wherein the leg loops are for supporting the animal from the rear legs while the lower section of the waist band is detached from the upper section of the waist band at the first releasable latching mechanism.

* * * * *